(12) United States Patent
Storiale et al.

(10) Patent No.: US 11,893,564 B2
(45) Date of Patent: Feb. 6, 2024

(54) POST-PURCHASE CREDIT OFFER AND TENDER SWITCH

(71) Applicant: Synchrony Bank, Stamford, CT (US)

(72) Inventors: Michael Storiale, Rocky Hill, CT (US);
Lisa Hammond, Alpharetta, GA (US);
William Kievit, Stamford, CT (US);
Tiffanie Terry, Charlotte, NC (US);
Carter Hudson, Charlotte, NC (US);
Jake Miller, Stamford, CT (US)

(73) Assignee: SYNCHRONY BANK, Stamford, CT (US)

( * ) Notice: Subject to any disclaimer, the term of this patent is extended or adjusted under 35 U.S.C. 154(b) by 53 days.

(21) Appl. No.: 17/471,227

(22) Filed: Sep. 10, 2021

(65) Prior Publication Data

US 2022/0067691 A1    Mar. 3, 2022

Related U.S. Application Data

(63) Continuation of application No. 16/923,342, filed on Jul. 8, 2020, now Pat. No. 11,144,904.

(60) Provisional application No. 62/871,550, filed on Jul. 8, 2019.

(51) Int. Cl.
  *G06Q 20/22* (2012.01)
  *G06Q 20/40* (2012.01)
  *G06Q 30/0235* (2023.01)
  *G06Q 40/03* (2023.01)

(52) U.S. Cl.
  CPC ....... *G06Q 20/227* (2013.01); *G06Q 20/4037* (2013.01); *G06Q 30/0235* (2013.01); *G06Q 40/03* (2023.01)

(58) Field of Classification Search
  CPC .. G06Q 20/227; G06Q 20/4037; G06Q 40/03; G06Q 30/0235
  See application file for complete search history.

(56) References Cited

U.S. PATENT DOCUMENTS

| | | | |
|---|---|---|---|
| 8,788,324 B1 * | 7/2014 | Shetty | G06Q 30/0601 705/14.1 |
| 9,785,933 B2 * | 10/2017 | Ferreira Da Silva | G06Q 20/10 |
| 10,402,897 B1 | 9/2019 | Czyzweski et al. | |
| 10,528,858 B1 | 1/2020 | Murphy et al. | |
| 2012/0253852 A1 | 10/2012 | Pourfallah et al. | |
| 2012/0284138 A1 | 11/2012 | Shave | |
| 2016/0125460 A1 * | 5/2016 | Zellner | G06Q 20/405 705/26.7 |
| 2016/0358250 A1 | 12/2016 | Dogin et al. | |
| 2017/0004573 A1 | 1/2017 | Hussain | |
| 2017/0017942 A1 | 1/2017 | Nix et al. | |

(Continued)

OTHER PUBLICATIONS

Office Action dated May 19, 2022 in India Patent Application 202247001029.

(Continued)

*Primary Examiner* — Scott C Anderson
(74) *Attorney, Agent, or Firm* — Polsinelli LLP

(57) ABSTRACT

Disclosed embodiments may provide a framework to implement post-purchase tender switches. For example, following a transaction made with a particular payment instrument, a customer may be offered the ability to apply for a preferred payment instrument and/or to switch his or her tender type to the preferred payment instrument for the previous transaction.

21 Claims, 8 Drawing Sheets

(56) References Cited

U.S. PATENT DOCUMENTS

| | | | |
|---|---|---|---|
| 2017/0083930 A1 | 3/2017 | Nagaraj et al. | |
| 2018/0039989 A1* | 2/2018 | Beye | G06Q 30/0601 |
| 2018/0216946 A1* | 8/2018 | Gueye | G01C 21/3617 |
| 2018/0308100 A1* | 10/2018 | Haukioja | G06Q 20/206 |
| 2019/0213660 A1 | 7/2019 | Astrada et al. | |
| 2020/0151726 A1 | 5/2020 | Song et al. | |

OTHER PUBLICATIONS

International Search Report and Written Opinion dated Oct. 28, 2020 in International Application PCT/US2020/014477.
Office Action dated Nov. 4, 2020 in U.S. Appl. No. 16/923,342.
Office Action dated Feb. 3, 2021 in U.S. Appl. No. 16/923,342.
Notice of Allowance dated Jun. 16, 2021 in U.S. Appl. No. 16/923,342.
International Preliminary Report on Patentability dated Jan. 20, 2022 in International Application PCT/US2020/014477.

\* cited by examiner

POST-PURCHASE CREDIT OFFER AND TENDER SWITCH

CROSS REFERENCE TO RELATED APPLICATIONS

The present application is a continuation of U.S. patent application Ser. No. 16/923,342 filed Jul. 8, 2020, which claims priority of provisional U.S. Application No. 62/871,550, filed Jul. 8, 2020, both of which are incorporated by reference herein their entireties.

FIELD

The present disclosure relates generally to credit transactions. In one example, the systems and methods described herein may be used to implement post-purchase credit offers and post-purchase tender switches.

SUMMARY

Disclosed embodiments may provide a framework to implement post-purchase tender switches. For example, following a purchase made with one credit or debit card, a customer may be offered the ability to apply for another credit card and/or to switch his or her tender type to another credit card for the previous purchase. A specific implementation of the systems and methods described herein may be that a customer uses a payment instrument (e.g., credit card, debit card, etc.) associated with a bank to make a purchase. After completing the purchase, the customer may be contacted via text message, e-mail, telephone, mail, or any other suitable method with an offer to apply for a preferred payment instrument with the specific retailer at which the purchase was made. Alternatively, if it is determined that that customer already has a line of credit associated with the preferred payment instrument, an offer may be made to refund the purchase to the payment instrument initially selected by the customer and instead process the transaction using the preferred payment instrument.

According to some embodiments, a computer-implemented method is provided. The method comprises receiving transaction information associated with a transaction. The transaction information specifies a selected payment instrument and contact information for a customer completing the transaction. The method further comprises determining that the selected payment instrument is different from a preferred payment instrument for the transaction. The method further comprises identifying payment instruments previously issued to the customer. The payment instruments are identified using the contact information for the customer. The method further comprises determining whether to transmit an offer to switch the transaction from the selected payment instrument to the preferred payment instrument for the transaction. Determining whether to transmit the offer is based on the preferred payment instrument and the payment instruments previously issued to the customer. The method further comprises transmitting the offer to switch the transaction from the selected payment instrument to the preferred payment instrument for the transaction.

According to some embodiments, a system is provided. The system comprises one or more processors and memory storing thereon instructions that, as a result of being executed by the one or more processors, cause the system to perform the steps of the above method.

According to some embodiments, a non-transitory, computer-readable storage medium is provided. The non-transitory, computer-readable storage medium stores thereon executable instructions that, as a result of being executed by one or more processors of a computer system, cause the computer system to perform operations including the steps of the above method.

This summary is not intended to identify key or essential features of the claimed subject matter, nor is it intended to be used in isolation to determine the scope of the claimed subject matter. The subject matter should be understood by reference to appropriate portions of the entire specification of this patent application, any or all drawings, and each claim.

The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Disclosed embodiments may provide a framework to implement post-purchase tender switches. For example, following a transaction made with a particular payment instrument (e.g., credit or debit card, etc.), a customer may be offered the ability to apply for a preferred payment instrument and/or to switch his or her tender type to the preferred payment instrument for the previous purchase. A specific implementation of the systems and methods described herein may be that a customer uses a debit card associated with a bank to make a purchase. After completing the purchase, the customer may be contacted via text message, e-mail, telephone, mail, or any other suitable method with an offer to apply for a preferred payment instrument with the specific retailer at which the purchase was made. Alternatively, if it is determined that that customer already has a line of credit associated with the preferred payment instrument, an offer may be made to refund the purchase to the previously selected payment instrument and instead charge the amount to the preferred payment instrument.

Offering credit at the point of purchase is one of the most successful times for acquisition. However, the process can be disrupted by numerous factors. In many retail environments, associates do not prompt the customer with the offer, or the customer is unwilling to explore the offer while trying to make a purchase. In new frictionless retail environments without traditional checkout, the point of friction where credit is offered is completely removed.

Figure 1:
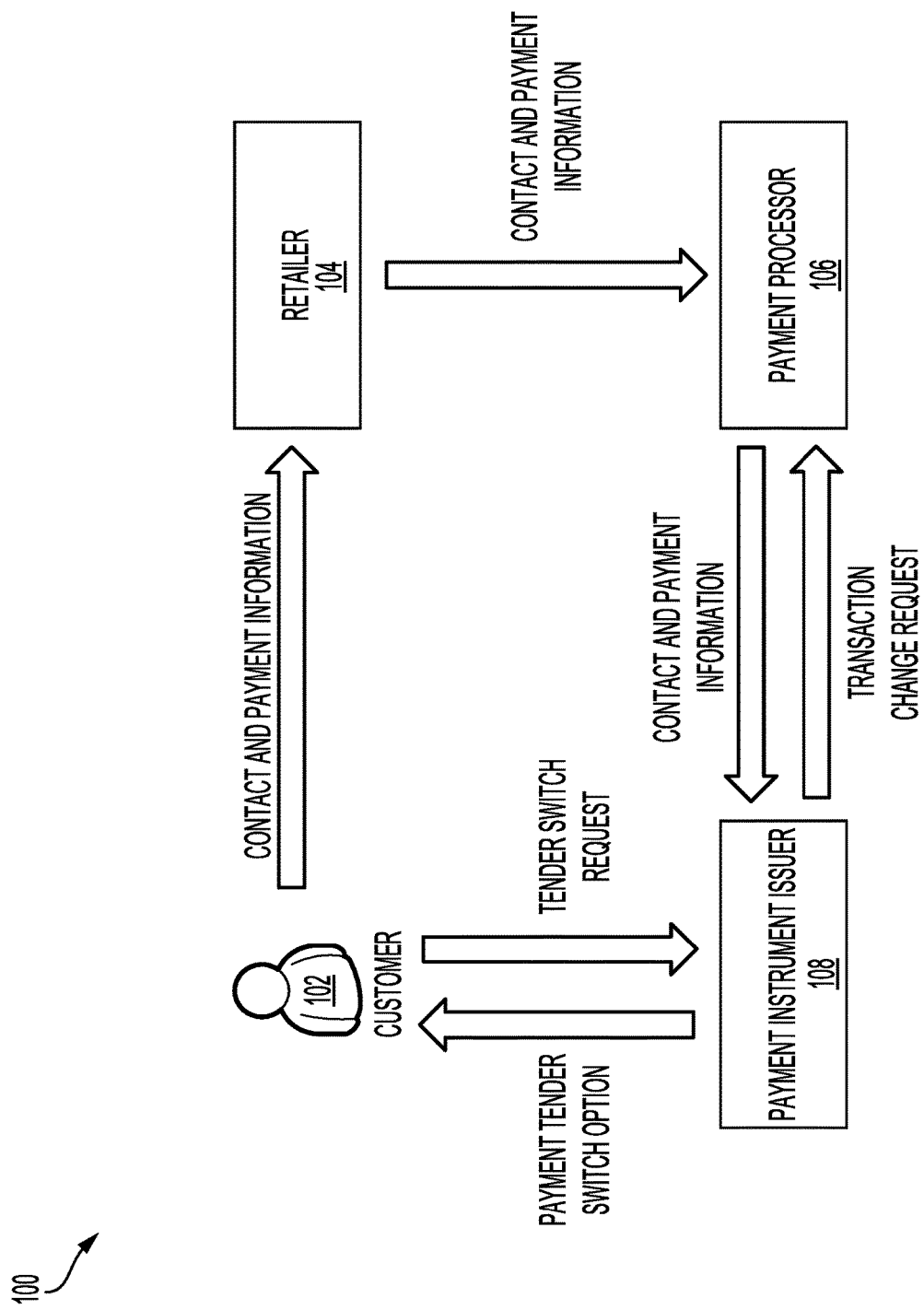
FIG. 1 shows an illustrative example of an environment in which a customer is offered a payment tender switch option by a payment instrument issuer based on a pending transaction with a retailer in accordance with at least one embodiment.

FIG. 1 shows an illustrative example of an environment 100 in which a customer 102 is offered a payment tender switch option by a payment instrument issuer 108 based on a pending transaction with a retailer 104 in accordance with at least one embodiment. In the environment 100, a customer 102 may initiate a transaction with a particular retailer 104. For instance, the customer 102, via a website or application supplied by the retailer 104 to the customer 102, may add one or more items to a virtual cart and initiate a checkout process to submit an order for the one or more items specified in the virtual cart. Alternatively, if the customer 102 is engaged with the retailer 104 at a point of sale (e.g., a physical retail location, etc.), the customer 102 may interact with a sales agent or other employee of the retailer 104 at the point of sale to initiate a transaction for one or more items (e.g., goods) or services provided by the retailer 104. As part of the transaction, the customer 102 may supply a payment instrument (e.g., credit card, debit card, gift card, etc.) to provide sufficient tender for the transaction and enable the retailer 104 to complete the transaction with the customer 102.

In some instances, the customer 102 may also supply, to the retailer 104, additional information that may be used to identify the customer 102. For example, if the retailer 104 requires that the customer 102 maintain a membership with the retailer 104 in order to transact with the retailer 104, the customer 102 may supply its membership information to the retailer 104. The membership information may include a membership card or other credential (e.g., username associated with the membership, a telephone number associated with the membership, an image of the customer 102, etc.) that may be used by the retailer 104 to verify the customer's membership. Additionally, or alternatively, if the customer 102 is a member of a loyalty rewards program with the retailer 104, the customer 102 may supply its loyalty rewards program membership information (e.g., a loyalty card, a membership identifier, etc.) to the retailer 104 in order to obtain rewards points, discounts, credits, and the like. In some instances, the retailer 104 may solicit the customer 102 for contact information of the customer 102. For example, the retailer 104 may prompt the customer 102 to provide an e-mail address or mobile telephone number through which the retailer 104 may provide a receipt for the transaction, provide advertisements and/or special offers, alert the customer 102 of upcoming products, and the like. The retailer 104 may utilize this contact information to generate or update a customer account for the customer 102.

In an embodiment, once the transaction has been completed by the retailer 104, the retailer 104 submits the contact information of the customer 102 and the payment information associated with the payment tender supplied by the customer 102 to a payment processor 106. The payment information associated with the payment tender may specify a payment amount for the transaction and account information associated with the payment tender (e.g., credit card number, debit card number, name specified on credit/debit card, expiration date of credit/debit card, security code of the credit/debit card, credit/debit card type, etc.). The contact information of the customer 102 may include the information supplied by the customer 102 to the retailer 104 during the transaction, as described above. Additionally, or alternatively, the contact information may include customer information garnered from a customer account maintained by the retailer 104. For instance, if the customer 102 provides an e-mail address or username during the transaction, the retailer 104 may identify an existing customer account associated with the e-mail address or username. From this account, the retailer 104 may retrieve additional information about the customer 102, such as additional contact information (e.g., telephone number(s), mailing addresses, etc.). This additional contact information may be supplied to the payment processor 106 with the contact information provided by the customer 102 via the transaction and the payment information associated with the transaction.

In response to receiving the payment information and contact information of the customer 102, the payment processor 106 may hold the corresponding transaction in an authorized but unsettled or pending state. In an embodiment, the payment processor 106 further provides the obtained payment information and contact information of the customer 102 to a payment instrument issuer 108 associated with the retailer 102. The payment instrument issuer 108 may issue or offer, to customers of the retailer 104, payment instruments (e.g., credit cards, debit cards, etc.) that are associated with the retailer 104 in some form. For instance, the payment instruments may be branded with iconography (e.g., logos, trademarks, etc.) of the retailer 104. Further, the retailer 104 may provide, along with the payment instrument issuer 108, the capital required for the lines of credit issued to customers of the retailer 104 and associated with the payment instruments issued by the payment instrument issuer 108. The payment instruments may also be linked to corresponding loyalty or membership accounts with the retailer 104, whereby purchases or transactions made using the payment instrument may result in the customer earning loyalty points, rewards, discounts, and the like. In some instances, customers may be incentivized to utilize these payment instruments in order to earn these loyalty points, rewards, discounts, and the like.

In an embodiment, the payment instrument issuer 108 evaluates the payment information provided by the payment processor 106 to identify the payment instrument utilized by the customer 102 in its transaction with the retailer 104. For instance, the payment instrument issuer 108 may utilize a credit card or debit card number specified in the payment information to determine whether the credit card or debit card is a preferred payment instrument for transactions with the retailer 104. As an example, if the preferred payment instrument is a credit card associated with the retailer 104 (e.g., a retailer-branded credit card that is tied to a loyalty rewards program of the retailer 104, etc.), the payment instrument issuer 108 may use the payment information to determine whether the payment instrument utilized by the customer 102 for the transaction with the retailer 104 is a credit card associated with the retailer 104. If the payment instrument issuer 108 determines, based on the supplied payment information, that the customer 102 has utilized the preferred payment method, the payment instrument issuer 108 may transmit a notification to the payment processor 106 to indicate that the transaction can be completed, subject to any credit limits associated with the payment instrument utilized by the customer 102.

In an embodiment, if the payment instrument issuer 108 determines that the customer 102 has utilized a payment instrument other than a preferred payment instrument for the retailer 104, the payment instrument issuer 108 determines whether to extend an offer to the customer 102 to switch the payment tender from the utilized payment instrument to the preferred payment instrument. The payment instrument issuer 108 may determine whether it maintains an account for the customer 102. For instance, if a customer 102 has been issued a payment instrument by the payment instrument issuer 108, the payment instrument issuer 108 may maintain an account for the customer 108. This account may specify, among other things, financial information of the customer 102, such as existing credit balances for each credit account of the customer 102, existing credit limits for each credit account of the customer 102, and the like. Further, the account may specify the payment instruments issued by the payment instrument issuer 108 to the customer 102. Using a customer's existing account, the payment instrument issuer 108 may determine whether a preferred payment instrument has been previously issued to the customer 102.

If the payment instrument issuer 108 determines that the customer 102 maintains a preferred payment instrument for the retailer 104 (e.g., a retailer-branded credit card, etc.), the payment instrument issuer 108 may transmit an offer to the customer 102 to transfer the pending transaction to the preferred payment instrument. For instance, using the contact information supplied by the payment processor 106 and obtained from the retailer 104, the payment instrument issuer 108 may transmit a notification to the customer 102 to present the tender switch offer (e.g., offer to transfer the pending transaction to the preferred payment instrument). In some instances, the tender switch offer may be provided with one or more incentives for the customer 102 to transfer the pending transaction to the preferred payment instrument. For instance, the tender switch offer may include an additional offer of a discount for a future transaction with the retailer 104 or other retailers that may be associated with the payment instrument issuer 108. Additionally, or alternatively, the tender switch offer may indicate that additional loyalty rewards points or benefits may be earned if the customer 102 transfers the pending transaction to the preferred payment instrument. As another example, the tender switch offer may indicate that the customer 102 will be provided with a free gift from the retailer 104 if the customer 102 transfers the pending transaction to the preferred payment instrument. It should be noted that the incentives described herein are for illustrative purposes and additional and/or alternative incentives may be presented to the customer 102 as part of the tender switch offer from the payment instrument issuer 108.

In an embodiment, if the customer 102 does not maintain a preferred payment instrument for the retailer 104, the payment instrument issuer 108 determines whether the customer 102 is pre-approved for the preferred payment instrument. For instance, using the contact information supplied by the payment processor 106, as well as other identifying information provided by the retailer 104 with regard to the customer 102 or maintained by the payment instrument issuer 108 (e.g., birthdate, last four digits of a Social Security number, etc.), the payment instrument issuer 108 may perform a soft inquiry of the customer's credit report to determine whether the customer 102 can be pre-approved for a line of credit that can be accessed via the preferred payment instrument. If the customer 102 is pre-approved for the preferred payment instrument, the payment instrument issuer 108 may generate an offer for the customer 102 for the preferred payment instrument. Further, through the offer, the payment instrument issuer 108 may offer the customer 102 with an opportunity to transfer the pending transaction to the preferred payment instrument if the customer 102 is approved for the preferred payment instrument. The offer may additionally may be provided with one or more incentives for the customer 102 to transfer the pending transaction to the preferred payment instrument, as described above.

In an embodiment, the payment instrument issuer 108 processes the payment information and contact information of the customer 102 associated with the pending transaction using a machine learning algorithm to determine whether to extend a tender switch offer to the customer 102. The machine learning algorithm may be trained using unsupervised learning techniques. For instance, a dataset of input transactions (including selected payment methods, customer information, goods or services purchased, etc.) may be analyzed using a clustering algorithm to identify the types of transactions and types of customers that are likely to be associated with the preferred payment instrument. Conversely, the dataset of input transactions may also be analyzed using a clustering algorithm to identify the types of transactions and types of customers that are not likely to utilize the preferred payment instrument or otherwise not likely to accept an offer to obtain the preferred payment instrument. Example clustering algorithms that may be trained using sample transactions (e.g., historical transaction data, hypothetical transaction data, etc.) to identify potential targets for a tender switch offer may include a k-means clustering algorithms, fuzzy c-means (FCM) algorithms, expectation-maximization (EM) algorithms, hierarchical clustering algorithms, density-based spatial clustering of applications with noise (DBSCAN) algorithms, and the like.

Based on the output of the machine learning algorithm generated using the transaction information for the pending transaction as input, the payment instrument issuer 108 may determine whether to extend a tender switch offer to the customer 102. Further, the response from the customer 102 with regard to the offer may be used to further train the machine learning algorithm.

If the customer 102 provides, in response to the tender switch offer, an application for the preferred payment instrument, the payment instrument issuer 108 may process the application to determine whether the customer 102 is approved for the preferred payment instrument. For instance, using the information supplied in the application, the payment instrument issuer 108 may perform a more detailed (e.g., hard) credit worthiness check to determine whether the customer 102 can be approved for the preferred payment instrument and, if so, the amount of the line of credit that is to be associated with the preferred payment instrument. Based on the amount of the line of credit, the payment instrument issuer 108 may determine whether this amount is sufficient for the pending transaction. For instance, if the payment amount for the pending transaction exceeds the amount of the line of credit for the preferred payment instrument, the payment instrument issuer 108 may determine that a tender switch to the preferred payment instrument cannot be performed. This may result in the payment instrument issuer 108 maintaining the present transaction using the previously selected payment instrument.

In some instances, the payment instrument issuer 108 may transmit an offer to the customer 102 to split the pending transaction between the preferred payment instrument and the previously selected payment instrument. For instance, if the customer 102 is approved for a line of credit associated with the preferred payment instrument, and the line of credit is insufficient for the payment amount of the transaction, the payment instrument issuer 108 may present the customer 102 with an offer to split the pending transaction between the preferred payment instrument and the previously selected payment instrument. Similarly, if the payment instrument issuer 108 determines that the customer 102 currently has a line of credit associated with the preferred payment instrument, and that the line of credit is insufficient for the payment amount of the transaction, the payment instrument issuer 108 may present the customer 102 with an offer to split the pending transaction, as described above. The customer 102 may define, in response to the offer, the allocation of the payment amount amongst the payment instruments specified by the payment instrument issuer 108. Based on this allocation, the payment instrument issuer 108 may transmit new authorizations to the payment processor 106 that indicate, for the transaction, the allocation of payments from the different payment instruments, including the preferred payment instrument.

In some instances, rather than submitting an offer to the customer 102 for a new line of credit associated with the preferred payment instrument, the payment instrument issuer 108 may obtain, from the retailer 104, an application completed by the customer 102 for this new line of credit. For example, the retailer 104 may extend, to the customer 102, an offer to apply for a new line of credit associated with the preferred payment instrument prior to, or during, the transaction with the retailer 104. If the customer 102 accepts this offer, the retailer 104 may present the customer 102 with an application for this new line of credit, which can be used by the payment instrument issuer 108 to determine whether the customer 102 can be approved for the new line of credit associated with the preferred payment instrument. The application may be provided directly to the payment instrument issuer 108 by the retailer 104. Once the transaction has been completed, the payment instrument issuer 108 may evaluate the application to determine whether the customer 102 is approved for the new line of credit. If so, the payment instrument issuer 108 may transmit an offer to the customer 102 to switch the pending transaction from the previously selected payment instrument to the preferred payment instrument that the customer 102 has been approved for.

If the customer 102 submits a tender switch request to the payment instrument issuer 108 in response to the offer provided by the payment instrument issuer 108, the payment instrument issuer 108 may transmit a request to the payment processor 106 to change the payment authorization for the pending transaction from the previously selected payment instrument to the preferred payment instrument. For instance, in the request, the payment instrument issuer 108 may provide a substitute transaction that includes the elements of the original transaction (e.g., transaction payment amount, identifying information of the transaction, etc.) and information associated with the preferred payment instrument (e.g., credit card number of the preferred payment instrument, expiration date of the preferred payment instrument, etc.). Further, the payment instrument issuer 108 may provide its authorization for the transaction in its request. In response to the request, the payment processor 106 may modify or replace the existing transaction with the information provided in the request from the payment instrument issuer 108. Further, the payment processor 106 may complete processing the transaction and provide payment to the retailer 104 from the preferred payment instrument.

Figure 2:
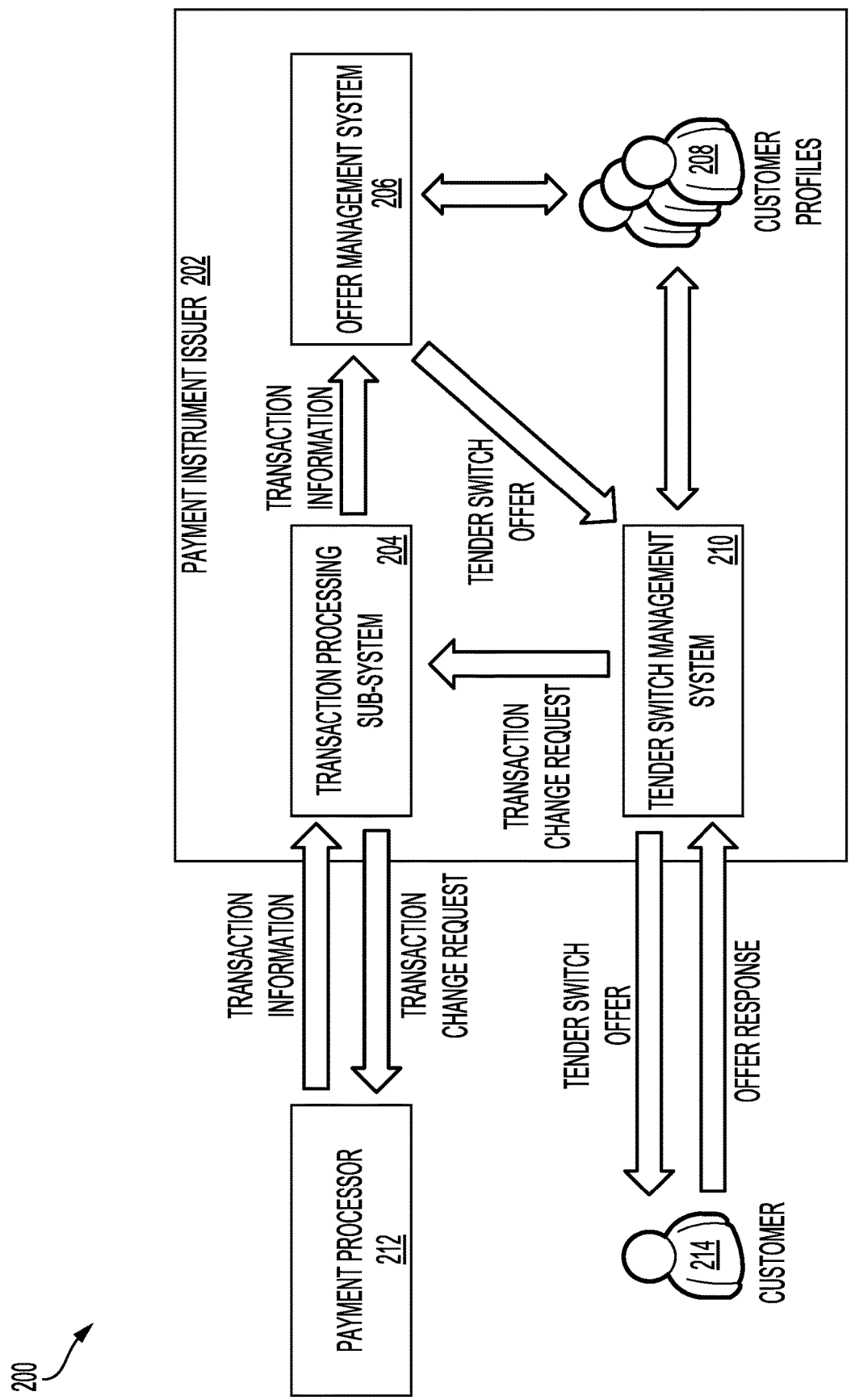
FIG. 2 shows an illustrative example of an environment in which a payment instrument issuer evaluates transaction information corresponding to a pending transaction to generate and provide a tender switch offer for the transaction in accordance with at least one embodiment.

FIG. 2 shows an illustrative example of an environment 200 in which a payment instrument issuer 202 evaluates transaction information corresponding to a pending transaction to generate and provide a tender switch offer for the transaction in accordance with at least one embodiment. In the environment 200, the payment instrument issuer 202, via a transaction processing sub-system 204, receives transaction information associated with a pending transaction between a customer 214 and a particular retailer. The transaction information may include payment information associated with the pending transaction (e.g., payment amount, payment instrument selected for the transaction, identifying information of the payment instrument, the expiration date of the payment instrument, any security codes of the payment instrument, etc.). Further, the transaction information may include identifying information of the customer 214 (e.g., customer name, customer e-mail address, customer telephone number, customer physical address, etc.). The transaction processing sub-system 204 may be implemented using a computer system or as an application or other executable code implemented on a computer system of the payment instrument issuer 202.

In response to obtaining the transaction information from the payment processor 212, the transaction processing sub-system 204 may transmit the transaction information to an offer management system 206 of the payment instrument issuer 202, which may process the transaction information to determine whether to extend a tender switch offer to the customer 214. The offer management system 206, similar to the transaction processing sub-system 204, may be implemented using a computer system or as an application or other executable code implemented on a computer system of the payment instrument issuer 202. The offer management system 206 may evaluate the transaction information to determine whether contact information of the customer 214 has been provided by the retailer. As noted above, a retailer may collect contact information of the customer during the transaction. For instance, the retailer may prompt the customer 214 to provide its contact information in order to identify an existing customer account associated with the retailer (e.g., loyalty rewards program, membership associated with the retailer, etc.). Alternatively, the retailer may prompt the customer 214 to provide its contact information in order to transmit a receipt, invoice, or other information associated with the transaction to the customer 214. In some instances, the retailer may maintain a database or other repository through which the retailer may obtain the customer's contact information. For example, if the customer 214 utilizes a username to access a website maintained by the retailer and initiate the transaction, the retailer may use the username to identify an entry associated with the customer 214. This entry may include any contact information previously supplied by the customer 214 to the retailer, such as through previous transactions, applications for lines of credit or membership with the retailer, and the like. Thus, the retailer may provide, as part of the transaction information, any available contact information for the customer 214.

If the offer management system 206 determines that the transaction information does not include contact information for the customer 214, the offer management system 206 may transmit a notification to the transaction processing subsystem 204 to indicate, to the payment processor 212, that the transaction is to be processed using the selected payment instrument. Alternatively, the offer management system 206 may query, using the transaction information, a customer profiles repository 208 to determine whether a customer profile exists of the customer 214. A customer profile maintained by the payment instrument issuer 202 may specify, among other things, financial information of the customer, such as existing credit balances for each credit account of the customer, existing credit limits for each credit account of the customer, and the like. Further, the account may specify the payment instruments issued by the payment instrument issuer 202 to the customer. A customer profile may also specify contact information of the customer. For instance, a customer may provide, to the payment instrument issuer 202, its contact information as part of an application for a line of credit with the payment instrument issuer 202. The payment instrument issuer 202 may store this contact information in the customer profile for the customer. Thus, if the transaction information does include contact information for the customer 214, the offer management system 206 may attempt to identify this contact information for the customer 214 from the customer profile of the customer 214, if the customer profile currently exists.

If the offer management system 206 identifies, based on the provided transaction information, an existing profile for the customer 214 from the customer profile repository 208, the offer management system 206 may evaluate the transaction information and the profile for the customer 214 to determine whether to extend a tender switch offer to the customer 214. For instance, if the customer profile indicates that the customer 214 maintains a line of credit associated with the preferred payment instrument (e.g., the customer 214 has been issued a retailer-branded credit card, etc.), the offer management system 206 may determine that a tender switch offer may be extended to the customer 214. Alternatively, if the customer 214 does not maintain a line of credit associated with the preferred payment instrument, the offer management system 206 may determine whether the customer 214 is pre-approved for a line of credit associated with the preferred payment instrument. The offer management system 206 may utilize information from the customer's profile (e.g., legal name, last four digits of a Social Security number, physical address, birthdate, income, etc.) to perform a soft credit worthiness check. Based on this check, the offer management system 206 may determine whether the customer 214 can be pre-approved for a line of credit associated with the preferred payment instrument.

In an embodiment, the offer management system utilizes a machine learning algorithm to determine whether to extend a tender switch offer and/or offer to open a line of credit associated with the preferred payment instrument to the customer 214. For instance, as noted above, the transaction information from the payment processor 212, as well as information from the customer profile of the customer 214, may be used as input to the machine learning algorithm to generate an output that indicates whether a tender switch offer should be extended to the customer 214 and, if the customer 214 does not maintain a line of credit associated with the preferred payment instrument, whether an offer to apply for the line of credit should be extended to the customer 214. Based on the output of the machine learning algorithm generated using the transaction information and the information from the customer's profile as input, the offer management system 206 may determine whether to extend a tender switch offer to the customer 214 and/or an offer for a line of credit associated with the preferred payment instrument.

If the offer management system 206 determines that a tender switch offer may be extended to the customer 214 for the transaction, the offer management system 206 may generate the tender switch offer and provide the tender switch offer to a tender switch management system 210 of the payment instrument issuer 202. The tender switch offer may specify elements of the pending transaction (e.g., name of the retailer, a receipt or invoice for goods or services purchased via the retailer, the payment amount, the payment instrument used for the transaction, etc.) as well as information regarding the preferred payment instrument. This information may specify a set of incentives for accepting the tender switch offer. For instance, the tender switch offer may specify that the customer 214 may earn additional loyalty rewards from the retailer if the customer 214 accepts the tender switch offer. As another example, the tender switch offer may additionally, or alternatively, specify that the customer 214 may be provided with a discount or credit towards a future purchase with the retailer if the customer 214 accepts the tender switch offer. If the tender switch offer is to be provided with an offer to apply for a line of credit associated with the preferred payment instrument, the offer management system 206 may provide this additional offer to the tender switch management system 210. This additional offer may specify that the customer 214 is pre-approved for the line of credit and may include an application (e.g., secure form, etc.) for the line of credit. The additional offer may be combined with the tender switch offer, whereby the tender switch offer may be contingent on the customer 214 being approved for the line of credit associated with the preferred payment instrument.

The tender switch management system 210 may be implemented using a computer system or as an application or other executable code implemented on a computer system of the payment instrument issuer 202. In response to obtaining the tender switch offer from the offer management system 206, the tender switch management system 210 may transmit the tender switch offer to the customer 214. For instance, based on the contact information of the customer 214 provided by the payment processor 212, the tender switch management system 210 may identify one or more methods for providing the tender switch offer to the customer 214. As an illustrative example, if the contact information includes an e-mail address and a telephone number of the customer 214, the tender switch management system 210 may transmit the tender switch offer in the form of an e-mail message to the e-mail address and in the form of a short message service (SMS) or multimedia messaging service (MIMS) message to a mobile device associated with the telephone number.

The tender switch management system 210 may process any responses from the customer 214 to the tender switch offer and/or offer to extend a line of credit associated with the preferred payment instrument. For instance, if the customer 214 accepts the tender switch offer and indicates that the payment instrument issuer 202 is authorized to process the pending transaction using the preferred payment instrument, the tender switch management system 210 may transmit a tender switch request to the transaction processing sub-system 204, which may, in turn, transmit the tender switch request to the payment processor 212. The tender switch request may include identifying information of the customer account associated with the preferred payment instrument (e.g., credit card number, credit card expiration date, credit card security code, etc.), as well as an authorization to process the transaction using the preferred payment instrument. This may cause the payment processor 212 to refund the payment amount to the previously selected payment instrument account and charge the payment amount to the preferred payment instrument of the customer 214. In an embodiment, if the preferred payment instrument is provided by the payment instrument issuer 202, rather than transmitting a tender switch request to the payment processor 212 to cancel the pending transaction using the previously selected payment instrument and to charge the payment amount to the preferred payment instrument, the transaction processing sub-system 204 can record the pending transaction using the preferred payment instrument locally (e.g., within the payment instrument issuer 202 network). Thus, the transaction processing sub-system 204 may provide, to the payment processor 212, a request to cancel the pending transaction using the previously selected payment instrument while processing the new transaction using the preferred payment instrument internally.

If the response from the customer 214 includes a completed application for a line of credit associated with the preferred payment instrument, the tender switch management system 210 may provide the completed application to the offer management system 206. The offer management system 206 may utilize the information provided in the completed application to perform a more detailed (e.g., hard) credit worthiness check to determine whether the customer 214 can be approved for the preferred payment instrument and, if so, the amount of the line of credit that is to be associated with the preferred payment instrument. Based on the amount of the line of credit, the offer management system 206 may determine whether this amount is sufficient for the pending transaction. For instance, if the payment amount for the pending transaction exceeds the amount of the line of credit for the preferred payment instrument, the offer management system 206 may determine that a tender switch to the preferred payment instrument cannot be performed. This may result in the offer management system 206 maintaining the present transaction using the previously selected payment instrument. Alternatively, if the offer management system 206 determines that the new line of credit is sufficient for the pending transaction, the offer management system 206 may transmit a notification to the tender switch management system 210 to indicate that the tender switch may be performed. This may cause the tender switch management system 210 to transmit the tender switch request to the payment processor 212 via the transaction processing sub-system 204, as described above.

Figure 3:
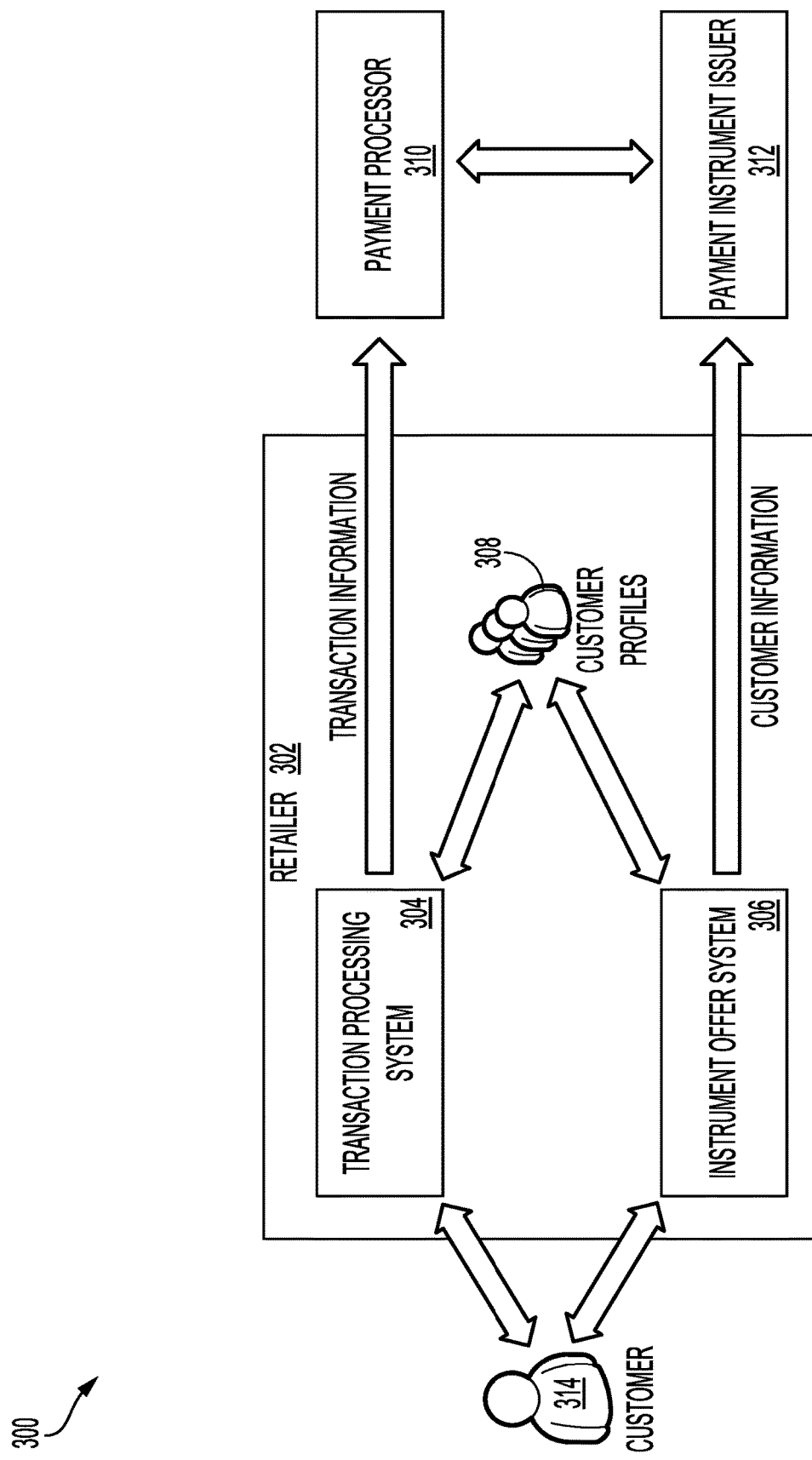
FIG. 3 shows an illustrative example of an environment in which a retailer submits transaction information corresponding to a transaction and customer information garnered via a payment instrument offer submitted to the customer in accordance with at least one embodiment.

FIG. 3 shows an illustrative example of an environment 300 in which a retailer 302 submits transaction information corresponding to a transaction and customer information garnered via a payment instrument offer submitted to the customer 314 in accordance with at least one embodiment. In the environment 300, a customer 314 interacts with a retailer 302 to initiate a transaction for goods and/or services provided by the retailer 302. As part of the transaction, the customer 314 may provide or select a form of payment (e.g., a payment tender), such as a credit card, debit card, and the like. The transaction may be processed by the retailer 302 using a transaction processing system 304. For instance, if the customer 314 initiates a transaction via a website or other online presence of the retailer 302, the customer 314 may submit a virtual cart to the transaction processing system 304. The transaction processing system 304 may be implemented using a computer system or as an application or other executable code implemented on a computer system of the retailer 302. For instance, the transaction processing system 304 may be implemented using a server of the retailer 302 or of a third-party service provider associated with the retailer 302 that manages transactions on behalf of the retailer 302.

In an embodiment, the transaction processing system 304 may access a customer profiles repository 308 to identify additional information of the customer 314. For example, if the customer 314 accesses the retailer 302 using a set of credentials (e.g., username and password, biometric information, etc.), the transaction processing system 304 may query the customer profiles repository 308 to determine whether there is an existing profile for the customer 314. A customer profile may specify, among other things, contact information for the customer 314 (e.g., e-mail addresses, physical addresses, telephone numbers, etc.) as well as any saved payment information (e.g., credit card information, debit card information, gift card balances, etc.) from which a payment method may be selected for a transaction. As part of the transaction process, the transaction processing system 304 may present, to the customer 314, the information from the customer's profile. This may assist the customer 314 in selecting a payment method and a preferred form of communication for contacting the customer 314 with regard to the transaction. Once the transaction has been completed, the transaction processing system 304 may transmit transaction information associated with the transaction to the payment processor 310. This transaction information may include the selected payment method and information associated with the payment method (e.g., credit/debit card number, credit/debit card expiration date, credit/debit card security code, etc.). Further, the transaction information may include contact information of the customer 314 corresponding to the preferred method of contact for the customer 314.

In an embodiment, the retailer 302, in a separate interaction with the customer 314, offers the customer 314 a payment instrument offer for a preferred payment instrument associated with the retailer 302. For instance, at a point of sale, the retailer 302 may implement an instrument offer system 306 through which a customer 314 can submit an application for a line of credit associated with a preferred payment instrument. As an example, at a point of sale, the retailer 302 may maintain a kiosk or other station whereby a customer 314 may be presented with an option to apply for a line of credit associated with the preferred payment instrument. The presentation of this option may be performed independent from any transaction between the customer 314 and the retailer 302. Alternatively, via a website or other online presence of the retailer 302, the customer 314 may be presented with an offer to apply for a preferred payment instrument outside of the transaction process described above. Thus, a customer 314, at any time and independent from any transaction with the retailer 302, may submit an application to the retailer 302 for a line of credit associated with a preferred payment instrument.

The instrument offer system 306 may be implemented using a computer system or as an application or other executable code implemented on a computer system of the retailer 302. Alternatively, the instrument offer system 306 may be implemented using a computer system or as an application or other executable code supplied by the payment instrument issuer 312 to the retailer 302 for use in processing incoming applications for lines of credit associated with a preferred payment instrument. In an embodiment, in response to obtaining an application for a line of credit from the customer 314, the instrument offer system 306 stores contact information from the application within a customer profile of the customer 314 maintained within the customer profile repository 308. Further, the instrument offer system 306 may transmit the submitted application to the payment instrument issuer 312, which may evaluate the application to determine whether the customer 314 can be approved for a line of credit associated with the preferred payment instrument. The payment instrument issuer 312 may use the application to also obtain any available contact information for the customer 314 without relying on transaction information from the payment processor 310 for any given transaction between the customer 314 and the retailer 302.

In an embodiment, in response to obtaining a transaction from the payment processor 310, the payment instrument issuer 312 evaluates the transaction to determine whether the transaction was conducted using the preferred payment instrument associated with the retailer 302. For instance, the payment instrument issuer 312 may evaluate any information regarding the payment instrument utilized by the customer 314 (e.g., credit/debit card number, etc.) to determine whether this payment instrument is a preferred payment instrument. If so, the payment instrument issuer 312 may determine whether the transaction may be processed and provide its determination to the payment processor 310. However, if the payment instrument issuer 312 determines that the payment instrument utilized by the customer 314 is not a preferred payment instrument, the payment instrument issuer 312 may determine whether the customer 314 has previously submitted an application for a line of credit associated with the preferred payment instrument.

If the payment instrument issuer 312 has determined that the customer 314 has previously submitted an application, via the instrument offer system 306 of the retailer 302, to the payment instrument issuer 312 for a line of credit associated with the preferred payment instrument, the payment instrument issuer 312 may evaluate the application whether the customer 314 can be approved for this line of credit. For instance, using the information provided in the application, the payment instrument issuer 312 may perform a credit worthiness check of the customer 314 to determine whether the requested line of credit may be issued to the customer 314. In an embodiment, if the payment instrument issuer 312 determines that the customer 314 is approved for the requested line of credit, and the customer 314 has used a different payment instrument in its transaction with the retailer 302, the payment instrument issuer 312 transmits a tender switch offer to the customer 314. The tender switch offer may indicate that the customer 314 has been approved for a line of credit associated with the preferred payment instrument. Further, the tender switch offer may indicate that the customer 314 is eligible to switch their transaction with the retailer 302 from the previously selected payment instrument to the preferred payment instrument for which the customer 314 was approved. The tender switch offer may also present the customer 314 with various incentives for accepting the tender switch offer, such as bonus loyalty rewards points with the retailer 302, discounts or coupons for future purchases or transactions with the retailer 302, and the like.

In an embodiment, if the customer 314 provides to the instrument offer system 306 contact information of the customer 314 instead of an application for a line of credit associated with the preferred payment instrument, the payment instrument issuer 312 uses the contact information to transmit a tender switch offer to the customer 314 that includes an application or other solicitation for the preferred payment instrument. For instance, rather than submitting an application for a line of credit, the customer 314 may indicate that it is interested in learning more about the preferred payment instrument. This indication may include the customer's contact information. The payment instrument issuer 312 may use this contact information to generate a profile for the customer 314, which may be used to obtain the customer's contact information in response to receiving a new transaction from the payment processor 310 that involves the customer 314 and the retailer 302. Further, the information provided by the customer 314 may be used to determine whether the customer 314 is pre-approved for a line of credit associated with the preferred payment instrument. For instance, the payment instrument issuer 312 may utilize the information submitted by the customer 314 to perform a soft credit worthiness check and determine, based on this check, whether the customer 314 is pre-approved for a line of credit associated with the preferred payment instrument.

If the customer 314 accepts the tender switch offer, the payment instrument issuer 312 may transmit a request to the payment processor 310 to replace the existing transaction record for the transaction between the customer 314 and the retailer 302 with a new transaction record that indicates the preferred payment instrument as the payment method for the transaction. This may cause the payment processor 310 to process and complete the transaction using the preferred payment instrument. Further, if the transaction is completed using the preferred payment instrument, the payment instrument issuer 312 or retailer 302 may provide the customer 314 with the incentives specified in the tender switch offer. For instance, the customer 314 may be provided with a discount code or coupon towards a future transaction with the retailer 302, bonus loyalty rewards points or benefits, and the like.

Figure 4:
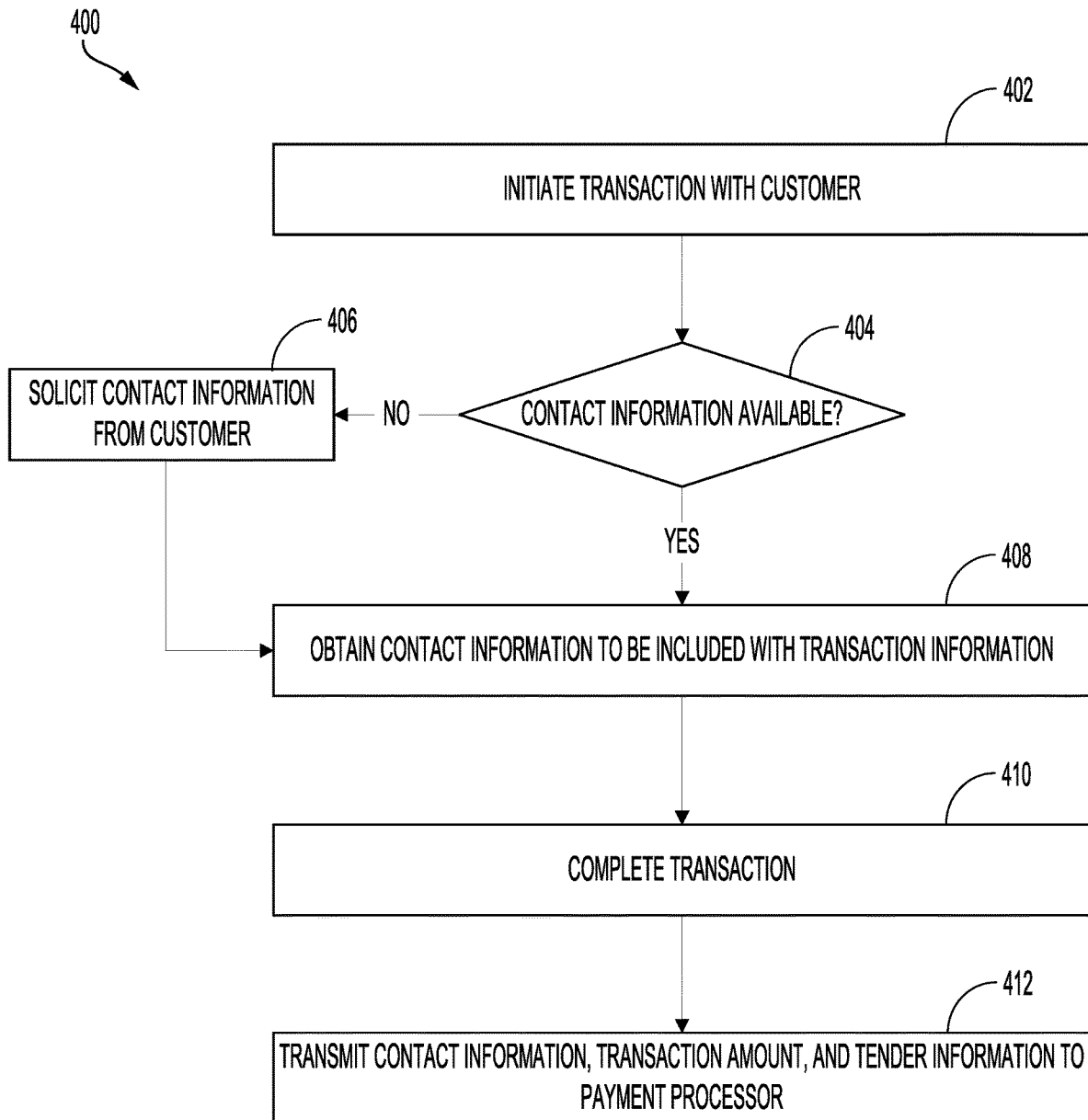
FIG. 4 shows an illustrative example of a process for transmitting transaction information and customer information to a payment processor in accordance with at least one embodiment.

FIG. 4 shows an illustrative example of a process 400 for transmitting transaction information and customer information to a payment processor in accordance with at least one embodiment. The process 400 may be performed by a retailer, which may engage in a transaction with a customer for goods and/or services provided by the retailer. At step 402, the retailer may initiate a transaction with a customer. For instance, the transaction may be initiated upon detecting a customer's selection of a checkout button via a website of the retailer. Alternatively, if at a point of sale, a sales agent of the retailer may begin performing a checkout for the customer, such as scanning any goods being purchased by the customer, entering one or more stock keeping units (SKUs) into a computer system at the point of sale, and the like.

At step 404, the retailer may determine whether contact information for the customer is available. For instance, if the customer submits a loyalty rewards program card or identifier to the retailer, the retailer may determine that the customer's contact information may be available via a customer profile associated with the loyalty rewards program. Similarly, if a membership is required to engage in a transaction with the retailer, the retailer may use the customer's membership information (e.g., membership card number, biometric information, etc.) to access a customer membership profile of the customer. This customer membership profile may include contact information for the customer. However, if a customer is not a known customer of the retailer (e.g., the customer does not maintain a loyalty rewards program membership or other membership with the retailer, etc.), customer contact information may not be available for the customer.

If the retailer determines that no contact information is available for the customer, the retailer, at step 406, solicits the customer for its contact information. For instance, as part of an online transaction, the retailer may prompt the customer to provide its contact information. As an illustrative example, the retailer may request that the customer provide contact information in order to provide a receipt or invoice for the transaction and/or to contact the customer in the event of an issue with the transaction. In some instances, the retailer may inform the customer that its contact information is being solicited in order to provide promotional materials of the retailer and of third-party services, such as the payment instrument issuer. As another illustrative example, if the transaction is initiated at a point of sale (e.g., physical location associated with the retailer), the retailer may prompt a sales agent engaged in the transaction to ask the customer for its contact information.

At step 408, the retailer obtains, either from an existing customer profile of the customer or from the customer itself (e.g., via submission through a website of the retailer, via a sales agent interacting with the customer, etc.), the contact information that is to be included with the transaction information associated with the transaction. In some instances, if the retailer does not have an existing customer profile of the customer, the retailer may generate a new customer profile of the customer to store the provided contact information. This new customer profile may be accessible by the customer via the retailer, through which the customer may update or modify its contact information at any time.

At step 410, the retailer completes the transaction with the customer. For instance, the retailer may obtain payment information from the customer for the transaction. This payment information may include a selected payment method and any additional information associated with the selected payment method. This additional information may include a credit/debit card number associated with the selected payment instrument, a credit/debit card expiration date associated with the selected payment instrument, a credit/debit card security code associated with the selected payment instrument, the name of the customer as indicated on the selected payment instrument, and the like. Further, the retailer may provide the customer with a receipt or invoice associated with the transaction. This receipt or invoice may be provided to the customer using a contact method associated with the contact information available for the customer. For instance, the retailer may transmit an e-mail message to the customer at a provided e-mail address, whereby the e-mail message may include the receipt or invoice for the transaction. Additionally, or alternatively, if the contact information for the customer includes a telephone number, the retailer may transmit an SMS, MMS, or other message to the customer at the specified telephone number to provide the receipt or invoice for the transaction.

In addition to providing the customer with a receipt or invoice for the transaction, the retailer, at step 412, transmits the customer's contact information, the transaction amount, and the payment tender information to a payment processor to continue processing the transaction. The payment processor may hold the transaction in authorized but unsettled or pending state. For instance, the transaction may be held in this state until the retailer fulfills its obligations to the customer as part of the transaction (e.g., ships goods ordered, performs the services requested, etc.). Additionally, while the transaction is held in this state, the payment processor may provide this obtained information to a payment instrument issuer, which may determine whether to transmit a tender switch offer to the customer to allow the customer an opportunity to transfer the transaction from the selected payment instrument to a preferred payment instrument associated with the retailer and/or payment instrument issuer, as described herein. In some instances, the transaction may be held in this state until the payment instrument issuer indicates that the transaction is to be processed (e.g., the payment instrument issuer has received an indication that the customer is not interested in a tender switch offer, the payment instrument issuer determines the customer is not eligible for a tender switch offer, etc.).

It should be noted that the process 400 may be performed using additional and/or alternative steps. For instance, in an embodiment, rather than transmitting the contact information of the customer to the payment processor with the transaction amount and tender information associated with the transaction, the retailer transmits the contact information of the customer directly to a payment instrument issuer that may provide the preferred payment instrument, as described above. For instance, independent of a transaction, the retailer may obtain contact information of the customer, such as through a customer application for a preferred payment instrument from the retailer. For example, a customer may apply for a line of credit associated with the preferred payment instrument at a point of sale or other physical location of the retailer and independent from any transaction with the retailer. The contact information of the customer may also be obtained via an application for a membership associated with the retailer or for enrollment in a loyalty rewards program associated with the retailer. In some instances, the contact information of the customer can be transmitted directly to the payment instrument issuer in response to the transaction, whereas the remaining transaction information may be provided to the payment processor. The contact information of the customer may be provided to the payment instrument issuer with a unique transaction identifier. The payment instrument issuer may utilize the unique transaction identifier to retrieve the customer's contact information in response to receiving a pending request from the payment processor.

Figure 5:
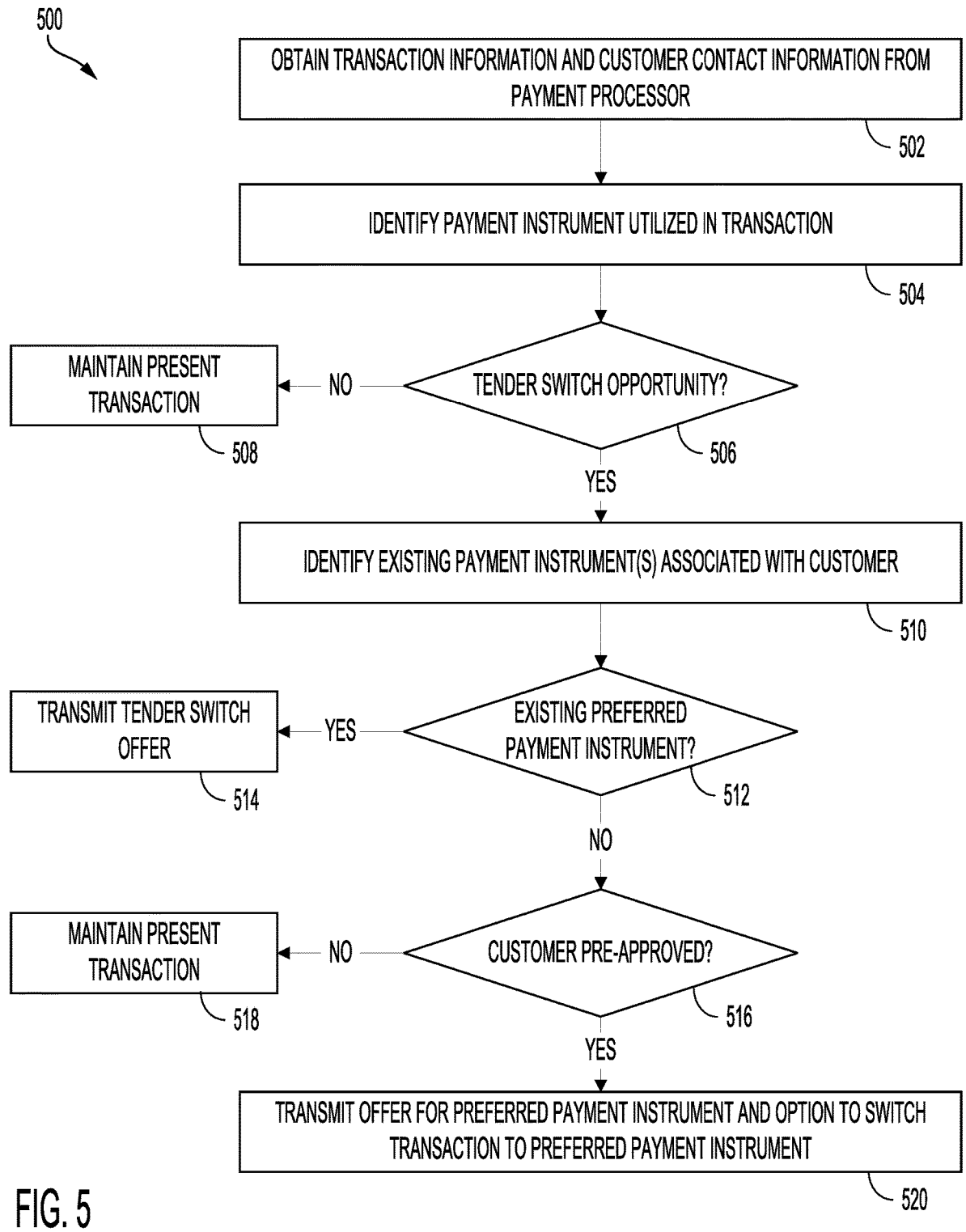
FIG. 5 shows an illustrative example of a process for evaluating transaction information and customer contact information to determine whether to present a customer with a tender switch option for a pending transaction in accordance with at least one embodiment.

FIG. 5 shows an illustrative example of a process 500 for evaluating transaction information and customer contact information to determine whether to present a customer with a tender switch option for a pending transaction in accordance with at least one embodiment. The process 500 may be performed by a payment instrument issuer, which may process incoming transactions from a payment processor to determine whether to submit a tender switch offer to customers of a retailer to promote a preferred payment instrument (e.g., retailer-branded credit card, etc.). At step 502, the payment instrument issuer obtains transaction information and customer contact information from a payment processor. The transaction information may specify the transaction amount, a selected payment instrument for the transaction (e.g., the credit/debit card selected by the customer, etc.), and information associated with the selected payment instrument (e.g., the credit/debit card number, the credit/debit card expiration date, the credit/debit card security code, the name of the customer as presented on the credit/debit card, etc.). The contact information for the customer may specify a preferred method of contact, as well any addresses/numbers associated with the preferred method of contact. This may include e-mail addresses, physical addresses, telephone numbers, and the like.

At step 504, the payment instrument issuer evaluates the transaction information provided by the payment processor to identify the payment instrument utilized in the transaction. For example, based on the credit/debit card number provided by the payment processor, the payment instrument issuer may determine the company or bank that issued the payment instrument. Alternatively, the transaction information may indicate which payment instrument was used in the transaction.

At step 506, the payment instrument issuer determines whether a tender switch opportunity exists for the customer. For instance, if the customer has utilized a preferred payment instrument associated with the retailer for the transaction, the payment instrument issuer may determine that a tender switch offer is not required. In some instances, if the customer has indicated, as part of the transaction, that it does not want to receive any offers from the retailer and/or third-party services, the payment instrument issuer may determine that no tender switch opportunity exists for the present transaction. If the payment instrument issuer determines that no tender switch opportunity exists for the present transaction, the payment instrument issuer, at step 508, maintains the present transaction. This may include transmitting a notification to the payment processor to complete processing the transaction using the selected payment instrument.

However, if the payment instrument issuer determines that a tender switch opportunity exists for the present transaction, the payment instrument issuer, at step 510, identifies the existing payment instruments associated with the customer. For instance, if the customer has selected a payment instrument other than the preferred payment instrument associated with the retailer, the payment instrument issuer may access a profile associated with the customer to identify any existing lines of credit associated with other payment instruments that the customer may have. To identify the profile associated with the customer, the payment instrument issuer may utilize the contact information supplied by the payment processor along with the transaction information for the pending transaction.

Using the information specified in the customer's profile, the payment instrument issuer, at step 512, determines whether the customer maintains an existing line of credit associated with the preferred payment instrument. For instance, the customer, at a time prior to the present transaction, may have established a line of credit for the preferred payment instrument. Information associated with this line of credit may be specified in the customer's profile maintained by the payment instrument issuer. If the payment instrument issuer determines that the customer has a line of credit associated with the preferred payment instrument, the payment instrument issuer, at step 514, transmits a tender switch offer to the customer to switch its payment from the selected payment instrument to the preferred payment instrument. The tender switch offer may specify the preferred payment instrument to which the transaction may be transferred, as well as any incentives that are available to the customer if the customer accepts the tender switch offer. For instance, the tender switch offer may indicate that the customer may become eligible for discounts or credits towards future transactions with the retailer if the customer accepts the tender switch offer. Similarly, the tender switch offer may indicate that the customer may receive additional loyalty rewards points or benefits if the customer accepts the tender switch offer.

In an embodiment, if the available amount of credit associated with the preferred payment instrument is insufficient to cover the amount of the transaction, the payment instrument issuer determines whether the transaction can be split between the selected payment instrument and the preferred payment instrument. For instance, in the tender switch offer, the preferred payment instrument may indicate the amount from the present transaction that can be transferred from the selected payment instrument to the preferred payment instrument. This amount may correspond to the available credit associated with the preferred payment instrument. Alternatively, the payment instrument issuer may present the customer, via the tender switch offer, with an option to split a pending transaction between the selected payment instrument and the preferred payment instrument. Via this option, the customer may define the amount that is to be allocated to the preferred payment instrument. In some instances, the customer may define any credit limits for the preferred payment instrument, whereby the line of credit for the preferred payment instrument must be maintained with a minimum amount of available credit. Thus, the payment instrument issuer may determine, based on these credit limits and the available credit for the preferred payment instrument, whether a tender switch offer may be made to the customer. If not, the payment instrument issuer may transmit a notification to the payment processor to maintain the present transaction using the selected payment instrument.

If the payment instrument issuer determines that the customer does not have an existing line of credit associated with the preferred payment instrument, the payment instrument issuer determines, at step 516, whether the customer is pre-approved for a line of credit associated with the preferred payment instrument. For instance, using the contact information of the customer supplied by the payment processor, the payment instrument issuer may perform a soft credit worthiness check of the customer. Based on this soft credit worthiness check, the payment instrument issuer may determine whether the customer can be pre-approved for a line of credit associated with the preferred payment instrument. A soft credit worthiness check may include a soft evaluation of the customer's credit report, whereby the evaluation does not impact the customer's credit score or other measure of credit worthiness. If the payment instrument issuer determines, based on the soft credit worthiness check, that the customer cannot be pre-approved for a line of credit associated with the preferred payment instrument, the payment instrument issuer, at step 518, maintains the present transaction using the selected payment instrument.

As noted above, this may include transmitting a notification to the payment processor to complete processing the transaction using the selected payment instrument.

At step 520, if the payment instrument issuer determines that the customer is pre-approved for a line of credit associated with the preferred payment instrument, the payment instrument issuer transmits an offer to the customer indicating to the customer that it is pre-approved for a line of credit associated with the preferred payment instrument. Further, the offer may include an option for the customer to switch the pending transaction from the selected payment instrument to the preferred payment instrument subject to the customer being approved for the line of credit associated with the preferred payment instrument. Similar to the tender switch option described above, the offer may specify any incentives that are available to the customer if the customer is approved for a line of credit associated with the preferred payment instrument and indicates that the pending transaction can be switched to the preferred payment instrument. For instance, the offer may indicate that the customer may become eligible for discounts or credits towards future transactions with the retailer if the customer is approved for the line of credit associated with the preferred payment instrument and transfers the transaction to the preferred payment instrument. Similarly, the offer may indicate that the customer may receive additional loyalty rewards points or benefits if the customer is approved for the line of credit associated with the preferred payment instrument and transfers the transaction to the preferred payment instrument.

Figure 6:
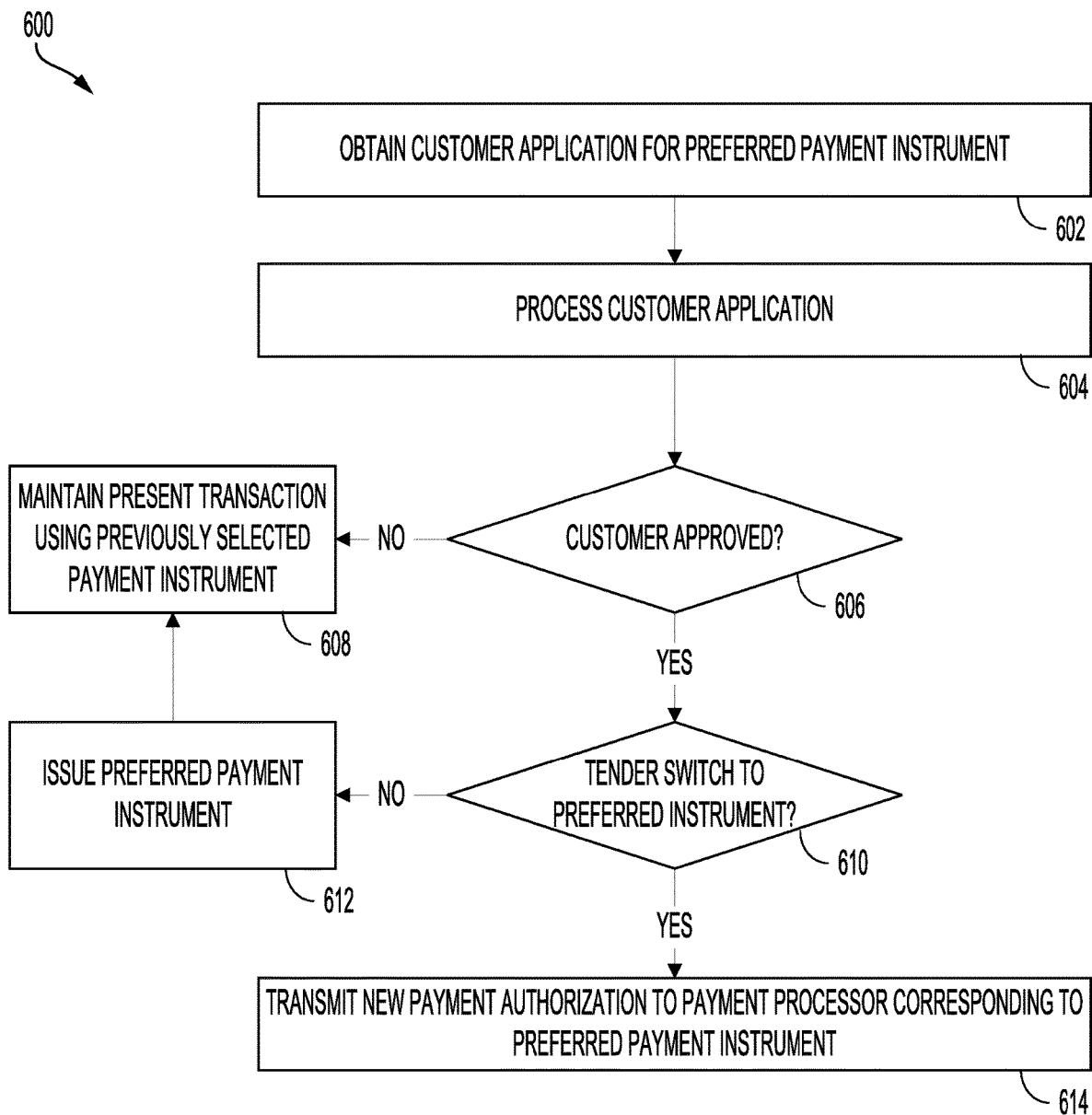
FIG. 6 shows an illustrative example of a process for evaluating a customer application for a preferred payment instrument to determine whether to issue the preferred payment instrument and to switch a pending transaction to the preferred payment instrument in accordance with at least one embodiment.

FIG. 6 shows an illustrative example of a process 600 for evaluating a customer application for a preferred payment instrument to determine whether to issue the preferred payment instrument and to switch a pending transaction to the preferred payment instrument in accordance with at least one embodiment. The process 600 may be performed by the payment instrument issuer, which can process incoming applications to establish a line of credit associated with a preferred payment instrument associated with a retailer. Further, the payment instrument issuer can also process incoming requests to perform, in conjunction with a payment processor, a payment tender switch from a previously selected payment instrument to the preferred payment instrument. In some instances, the process 600 is performed during the processing of a transaction provided by a payment processor.

At step 602, the payment instrument issuer obtains a customer application for a preferred payment instrument. For instance, if the customer was pre-approved for a line of credit associated with the preferred payment instrument based on information provided by the payment processor and obtained as a result of a transaction between the customer and a retailer, the payment instrument issuer may transmit, to the customer, an offer indicating to the customer that it is pre-approved for a line of credit associated with the preferred payment instrument. In response to this offer, the customer may submit a completed application for the line of credit to the payment instrument issuer. Alternatively, the payment instrument issuer may obtain the customer application for a preferred payment instrument from a retailer. For instance, a customer may apply for a line of credit associated with the preferred payment instrument at a point of sale or other physical location of the retailer and independent from any transaction with the retailer.

At step 604, the payment instrument issuer processes the customer application for the preferred payment instrument. For instance, the payment instrument issuer may use the supplied information in the customer application to perform an in-depth (hard) credit worthiness check of the customer to determine the customer's credit worthiness. This may include identifying the customer's credit score with one or more credit reporting agencies, identifying any existing lines of credit maintained by the customer, the amount of outstanding debt incurred by the customer, any payment delinquencies by the customer, any bankruptcies associated with the customer, and the like. Based on this evaluation of the customer's application, the payment instrument issuer determines, at step 606, whether the customer is approved for a line of credit associated with the preferred payment instrument.

If the payment instrument issuer determines that the customer is not approved for a line of credit associated with the preferred payment instrument, the payment instrument issuer, at step 608, maintains the present transaction using the previously selected payment instrument. For instance, the payment instrument issuer may transmit a notification to the payment processor that provided transaction information associated with the present transaction to indicate that the present transaction is to proceed with the selected payment instrument. This may cause the payment processor to complete the transaction between the customer and the retailer using the selected payment instrument.

Alternatively, if the payment instrument issuer determines that the customer is approved for a new line of credit associated with the preferred payment instrument, the payment instrument issuer, at step 610, determines whether to perform a tender switch from the selected payment instrument to the preferred payment instrument. As noted above, as part of an offer to apply for a new line of credit associated with the preferred payment instrument, the payment instrument issuer may also offer the customer with an opportunity to transfer an existing transaction from the selected payment instrument to the preferred payment instrument subject to the customer being approved for a new line of credit associated with the preferred payment instrument. In some instances, the customer may provide an application for this new line of credit but specify that it does not want to transfer any transactions to this new line of credit. Alternatively, the customer may provide the application for this new line of credit and indicate that the pending transaction is to be transferred to this new line of credit should the customer be approved for this new line of credit.

If the payment instrument issuer determines that present transaction is not to be transferred to the preferred payment instrument, the payment instrument issuer, at step 612, can issue the preferred payment instrument to the customer. For instance, the payment instrument issuer may send the preferred payment instrument (e.g., credit card, debit card, etc.) to the customer for its use in future transactions, if so desired. Further, the payment instrument issuer, at step 608, can maintain the present transaction using the previously selected payment instrument. As noted above, the payment instrument issuer may transmit a notification to the payment processor that provided transaction information associated with the present transaction to indicate that the present transaction is to proceed with the selected payment instrument.

In an embodiment, if the payment instrument issuer determines that the customer has been approved for a new line of credit associated with a preferred payment instrument and that a present transaction is to be transferred to this new line of credit, the payment instrument issuer, at step 614, transmits a new payment authorization to the payment processor corresponding to the preferred payment instrument. For instance, the payment instrument issuer may transmit a request to the payment processor to cancel the pending transaction using the selected payment instrument and replace this pending transaction with a new transaction that incorporates the preferred payment instrument of the customer. The new transaction may be identical to the previously pending transaction with the exception of the payment information indicated therein. In addition to transmitting this new payment authorization to the payment processor, the payment instrument issuer may issue the preferred payment instrument to the customer, as described above.

Figure 7:
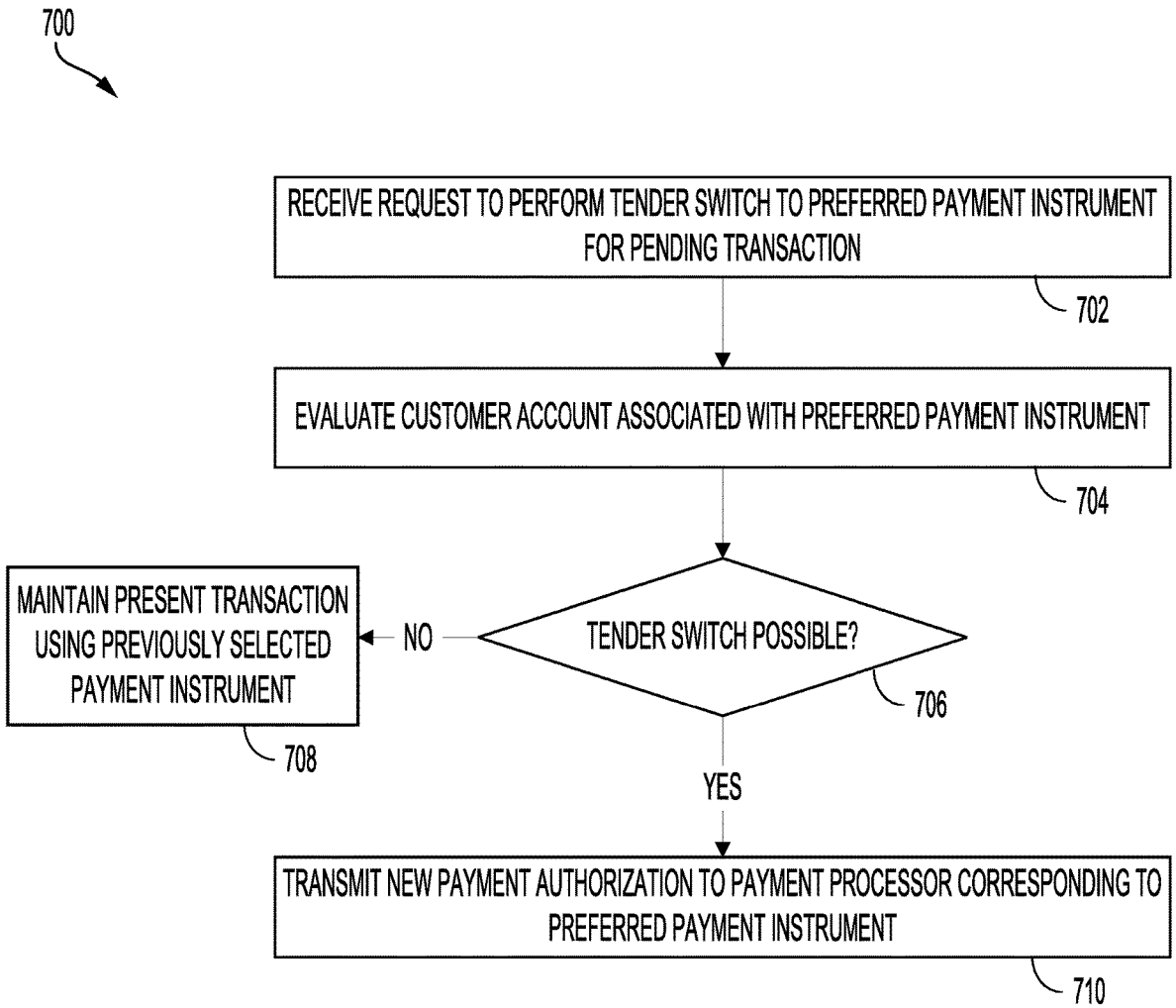
FIG. 7 shows an illustrative example of a process for performing a tender switch to a preferred payment instrument in response to a customer request to perform the tender switch in accordance with at least one embodiment.

FIG. 7 shows an illustrative example of a process 700 for performing a tender switch to a preferred payment instrument in response to a customer request to perform the tender switch in accordance with at least one embodiment. The process 700 may be performed by the payment instrument issuer, which may submit a tender switch offer to a customer in response to receiving transaction information of a pending transaction from a payment processor. The tender switch offer may be submitted to the customer in the event that the customer maintains a line of credit associated with the preferred payment instrument but has opted to utilize a different payment instrument for the given transaction. Alternatively, the tender switch offer may be submitted to the customer in addition to an offer to apply for a new line of credit associated with the preferred payment instrument. For instance, if the customer is pre-approved for a new line of credit associated with the preferred payment instrument, the preferred payment instrument may indicate, to the customer, that it is pre-approved for this new line of credit and offer the customer with an option to transfer a pending transaction to this new line of credit subject to the customer being approved for the new line of credit.

At step 702, the payment instrument issuer receives a request to perform a tender switch from a previously selected payment instrument to a preferred payment instrument for a pending transaction. For instance, in response to a tender switch offer from the payment instrument issuer, a customer may indicate that a pending transaction is to be transferred to the preferred payment instrument. As noted above, the tender switch offer may specify a set of incentives for performing a tender switch to the preferred payment instrument. For instance, the tender switch offer may include an additional offer of a discount for a future transaction with the retailer or other retailers that may be associated with the payment instrument issuer. Additionally, or alternatively, the tender switch offer may indicate that additional loyalty rewards points or benefits may be earned if the customer transfers the pending transaction to the preferred payment instrument. As another example, the tender switch offer may indicate that the customer will be provided with a free gift from the retailer if the customer transfers the pending transaction to the preferred payment instrument.

In response to the request to perform the tender switch to the preferred payment instrument for the pending transaction, the payment instrument issuer, at step 704, evaluates a customer account associated with the preferred payment instrument. The customer account may specify the remaining available credit for the preferred payment instrument. Additionally, the customer account may specify, for the particular tender switch offer, any limitation on the offer. This may include any expiration date for the offer, whereby if a request to perform a tender switch is obtained after this expiration date, the request may be denied. Similarly, this may include any limitations on the number of tender switches that may be performed to the preferred payment instrument for the customer. For instance, if the customer has already performed a maximum number of tender switches to the preferred payment instrument, any subsequent tender switch requests may be denied until the limitation is reset.

Based on an evaluation of the customer account, the payment instrument issuer determines, at step 706, whether the requested tender switch can be performed (e.g., is possible). For instance, if the customer has previously submitted a maximum number of tender switch requests for the preferred payment instrument, the payment instrument issuer may determine that the present tender switch request cannot be fulfilled. As another example, if the payment instrument issuer determines that the tender switch offer that the customer is responding to was expired prior to receiving the request, the payment instrument issuer may determine the request cannot fulfilled. As yet another example, if the transaction amount exceeds the remaining available credit for the preferred payment instrument, the payment instrument issuer may determine that the tender switch cannot be performed. In an embodiment, if the transaction amount exceeds the remaining available credit for the preferred payment instrument, rather than determining that the tender switch cannot be performed, the payment instrument issuer can split the transaction amount between the preferred payment instrument and the previously selected payment instrument subject to the remaining credit available for the preferred payment instrument. The payment instrument issuer may transmit a notification to the customer indicating this option, which the customer may utilize to either withdraw its tender switch request or agree to the payment allocation as specified by the payment instrument issuer. As an alternative, the customer may specify its own allocation of the payment amount between the preferred payment instrument and the previously selected payment instrument.

At step 708, if the payment instrument issuer determines that the tender switch request cannot be fulfilled, the payment instrument issuer maintains the present transaction using the previously selected payment instrument. For instance, the payment instrument issuer may transmit a notification to the payment processor that provided transaction information associated with the present transaction to indicate that the present transaction is to proceed with the selected payment instrument. This may cause the payment processor to complete the transaction between the customer and the retailer using the selected payment instrument.

At step 710, if the payment instrument issuer determines that the tender switch can be fulfilled, the payment instrument issuer transmits a new payment authorization to the payment processor corresponding to the preferred payment instrument. Similar to the process 600 described above, the payment instrument issuer may transmit a request to the payment processor to cancel the pending transaction using the selected payment instrument and replace this pending transaction with a new transaction that incorporates the preferred payment instrument of the customer. The new transaction may be identical to the previously pending transaction with the exception of the payment information indicated therein, whereby the new transaction may indicate information associated with the preferred payment instrument of the customer.

Figure 8:
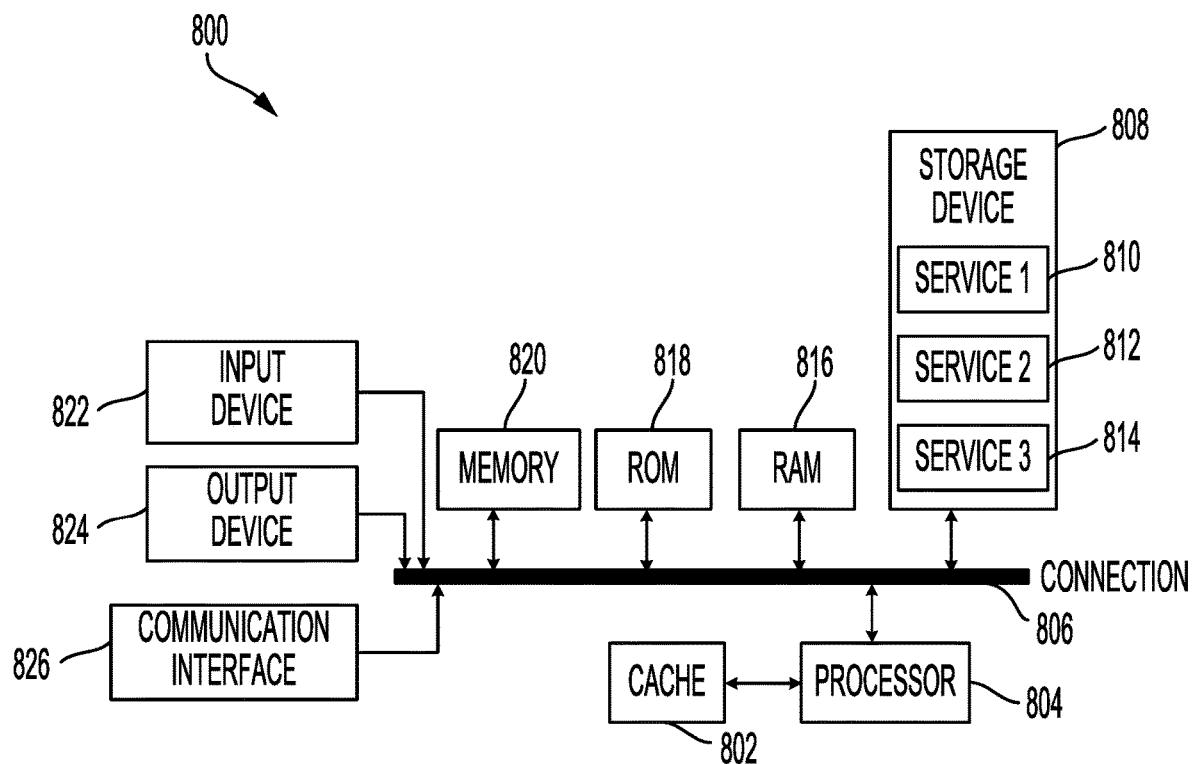
FIG. 8 shows a computing system architecture including various components in electrical communication with each other using a connection in accordance with various embodiments.

FIG. 8 illustrates a computing system architecture 800 including various components in electrical communication with each other using a connection 806, such as a bus, in accordance with some implementations. Example system architecture 800 includes a processing unit (CPU or processor) 804 and a system connection 806 that couples various system components including the system memory 820, such as ROM 818 and RAM 816, to the processor 804. The system architecture 800 can include a cache 802 of high-speed memory connected directly with, in close proximity to, or integrated as part of the processor 804. The system architecture 800 can copy data from the memory 820 and/or the storage device 808 to the cache 802 for quick access by the processor 804. In this way, the cache can provide a performance boost that avoids processor 804 delays while waiting for data. These and other modules can control or be configured to control the processor 804 to perform various actions.

Other system memory 820 may be available for use as well. The memory 820 can include multiple different types of memory with different performance characteristics. The processor 804 can include any general purpose processor and a hardware or software service, such as service 1 810, service 2 812, and service 3 814 stored in storage device 808, configured to control the processor 804 as well as a special-purpose processor where software instructions are incorporated into the actual processor design. The processor 804 may be a completely self-contained computing system, containing multiple cores or processors, a bus, memory controller, cache, etc. A multi-core processor may be symmetric or asymmetric.

To enable user interaction with the computing system architecture 800, an input device 822 can represent any number of input mechanisms, such as a microphone for speech, a touch-sensitive screen for gesture or graphical input, keyboard, mouse, motion input, speech and so forth. An output device 824 can also be one or more of a number of output mechanisms known to those of skill in the art. In some instances, multimodal systems can enable a user to provide multiple types of input to communicate with the computing system architecture 800. The communications interface 826 can generally govern and manage the user input and system output. There is no restriction on operating on any particular hardware arrangement and therefore the basic features here may easily be substituted for improved hardware or firmware arrangements as they are developed.

Storage device 808 is a non-volatile memory and can be a hard disk or other types of computer readable media which can store data that are accessible by a computer, such as magnetic cassettes, flash memory cards, solid state memory devices, digital versatile disks, cartridges, RAMs 816, ROM 818, and hybrids thereof.

The storage device 808 can include services 810, 812, 814 for controlling the processor 804. Other hardware or software modules are contemplated. The storage device 808 can be connected to the system connection 806. In one aspect, a hardware module that performs a particular function can include the software component stored in a computer-readable medium in connection with the necessary hardware components, such as the processor 804, connection 806, output device 824, and so forth, to carry out the function.

The disclosed methods can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to the network interface device. The interface can include one or more of a modem or network interface. It will be appreciated that a modem or network interface can be considered to be part of the computer system. The interface can include an analog modem, Integrated Services Digital network (ISDN0 modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, WA, and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method, comprising:
    determining a completion of a transaction at a point-of-sale system, wherein the completed transaction is held as a pending transaction until authorization for fulfillment of the transaction is provided, and wherein the completed transaction specifies a selected payment instrument associated with a customer;
    receiving an application for a new line of credit associated with a preferred payment instrument, wherein the application indicates contact information associated with a user device of the customer, and wherein the application is offered independent of the transaction;
    using a trained machine learning algorithm to generate an offer to switch the completed transaction from the selected payment instrument to the preferred payment instrument while the completed transaction is held as the pending transaction, wherein the machine learning algorithm is trained using a training dataset including historical transaction data associated with other customers;
    transmitting the offer, wherein the offer is transmitted using the contact information, and wherein when the offer is received by the user device of the customer, the user device presents the offer and an indication that the application is approved;
    detecting acceptance of the offer;
    switching the completed transaction to the preferred payment instrument;

authorizing the fulfillment of the completed transaction; and determining that the completed transaction is no longer being held as the pending transaction, wherein the trained machine learning algorithm is further trained based on the completed transaction and the acceptance of the offer.

2. The computer-implemented method of claim 1, wherein the offer specifies one or more incentives for switching the completed transaction from the selected payment instrument to the preferred payment instrument.

3. The computer-implemented method of claim 1, further comprising:
determining available credit associated with the preferred payment instrument, wherein the available credit is used to generate the offer.

4. The computer-implemented method of claim 1, wherein the offer is generated subject to an expiration, and wherein the offer is rescinded as a result of the expiration.

5. The computer-implemented method of claim 1, wherein the offer includes an option to split the completed transaction between the selected payment instrument and the preferred payment instrument.

6. The computer-implemented method of claim 1, wherein the offer is transmitted to the user device through a Short Message Service (SMS) message, and wherein the SMS message is transmitted using the contact information.

7. The computer-implemented method of claim 1, wherein the application is offered through a website, and wherein the website is independent of the point-of-sale system.

8. A system, comprising:
one or more processors; and
memory storing thereon instructions that, as a result of being executed by the one or more processors, cause the system to:
  determine a completion of a transaction at a point-of-sale system, wherein the completed transaction is held as a pending transaction until authorization for fulfillment of the transaction is provided, and wherein the completed transaction specifies a selected payment instrument associated with a customer;
  receive an application for a new line of credit associated with a preferred payment instrument, wherein the application indicates contact information associated with a user device of the customer, and wherein the application is offered independent of the transaction;
  use a trained machine learning algorithm to generate an offer to switch the completed transaction from the selected payment instrument to the preferred payment instrument while the completed transaction is held as the pending transaction, wherein the machine learning algorithm is trained using a training dataset including historical transaction data associated with other customers;
  transmit the offer, wherein the offer is transmitted using the contact information, and wherein when the offer is received by the user device of the customer, the user device presents the offer and an indication that the application is approved;
  detect acceptance of the offer;
  switch the completed transaction to the preferred payment instrument;
  authorize the fulfillment of the completed transaction; and
  determine that the completed transaction is no longer being held as the pending transaction, wherein the trained machine learning algorithm is further trained based on the completed transaction and the acceptance of the offer.

9. The system of claim 8, wherein the offer specifies one or more incentives for switching the completed transaction from the selected payment instrument to the preferred payment instrument.

10. The system of claim 8, wherein the instructions further cause the system to:
determine available credit associated with the preferred payment instrument, wherein the available credit is used to generate the offer.

11. The system of claim 8, wherein the offer is generated subject to an expiration, and wherein the offer is rescinded as a result of the expiration.

12. The system of claim 8, wherein the offer includes an option to split the completed transaction between the selected payment instrument and the preferred payment instrument.

13. The system of claim 8, wherein the offer is transmitted to the user device through a Short Message Service (SMS) message, and wherein the SMS message is transmitted using the contact information.

14. The system of claim 8, wherein the application is offered through a website, and wherein the website is independent of the point-of-sale system.

15. A non-transitory, computer-readable storage medium storing thereon executable instructions that, as a result of being executed by one or more processors of a computer system, cause the computer system to:
  determine a completion of a transaction at a point-of-sale system, wherein the completed transaction is held as a pending transaction until authorization for fulfillment of the transaction is provided, and wherein the completed transaction specifies a selected payment instrument associated with a customer;
  receive an application for a new line of credit associated with a preferred payment instrument, wherein the application indicates contact information associated with a user device of the customer, and wherein the application is offered independent of the transaction;
  use a trained machine learning algorithm to generate an offer to switch the completed transaction from the selected payment instrument to the preferred payment instrument while the completed transaction is held as the pending transaction, wherein the machine learning algorithm is trained using a training dataset including historical transaction data associated with other customers;
  transmit the offer, wherein the offer is transmitted using the contact information, and wherein when the offer is received by the user device of the customer, the user device presents the offer and an indication that the application is approved;
  detect acceptance of the offer;
  switch the completed transaction to the preferred payment instrument;
  authorize the fulfillment of the completed transaction; and
  determine that the completed transaction is no longer being held as the pending transaction, wherein the trained machine learning algorithm is further trained based on the completed transaction and the acceptance of the offer.

16. The non-transitory, computer-readable storage medium of claim 15, wherein the offer specifies one or more incentives for switching the completed transaction from the selected payment instrument to the preferred payment instrument.

17. The non-transitory, computer-readable storage medium of claim 15, wherein the executable instructions further cause the computer system to:
    determine available credit associated with the preferred payment instrument, wherein the available credit is used to generate the offer.

18. The non-transitory, computer-readable storage medium of claim 15, wherein the offer is generated subject to an expiration, and wherein the offer is rescinded as a result of the expiration.

19. The non-transitory, computer-readable storage medium of claim 15, wherein the offer includes an option to split the completed transaction between the selected payment instrument and the preferred payment instrument.

20. The non-transitory, computer-readable storage medium of claim 15, wherein the offer is transmitted to the user device through a Short Message Service (SMS) message, and wherein the SMS message is transmitted using the contact information.

21. The non-transitory, computer-readable storage medium of claim 15, wherein the application is offered through a website, and wherein the website is independent of the point-of-sale system.

\* \* \* \* \*